United States Patent
Garg et al.

(10) Patent No.: US 12,379,468 B2
(45) Date of Patent: Aug. 5, 2025

(54) RADAR CLUSTERING USING MACHINE LEARNING

(71) Applicant: QUALCOMM Incorporated, San Diego, CA (US)

(72) Inventors: Shubham Sanjeev Garg, Pittsburgh, PA (US); Amir Salimi, Seattle, WA (US); Jayakrishnan Unnikrishnan, Bellevue, WA (US); Avdhut Joshi, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 481 days.

(21) Appl. No.: 17/744,566

(22) Filed: May 13, 2022

(65) Prior Publication Data

US 2023/0366983 A1  Nov. 16, 2023

(51) Int. Cl.
  *G01S 13/66* (2006.01)
  *G01S 7/41* (2006.01)
  *G06N 3/04* (2023.01)
  *G06N 3/08* (2023.01)

(52) U.S. Cl.
  CPC .............. *G01S 7/417* (2013.01); *G01S 13/66* (2013.01); *G06N 3/04* (2013.01); *G06N 3/08* (2013.01)

(58) Field of Classification Search
  CPC .......... G06N 3/04; G06N 3/0464; G06N 3/08; G06N 3/084; G06N 3/09; G01S 13/66; G01S 13/89; G01S 7/417; G06V 10/7635; G06V 10/82; G06V 20/582
  See application file for complete search history.

(56) References Cited

U.S. PATENT DOCUMENTS

| | | | |
|---|---|---|---|
| 2004/0130620 A1* | 7/2004 | Buehler | G06V 40/20 348/E7.086 |
| 2013/0242285 A1* | 9/2013 | Zeng | G01S 17/875 356/28 |
| 2018/0307967 A1* | 10/2018 | Graf | G01S 7/417 |
| 2022/0076432 A1* | 3/2022 | Ramezani | G06N 3/044 |

OTHER PUBLICATIONS

Zhao, Ling; Song, Yujiao; Chao, Zhang; Liu, Yu; Wang, Pu; Lin, Tao; Deng, Min; Li, Haifeng. "T-GCN: A Temporal Graph Convolutional Network for Traffic Prediction". IEEE Transactions on Intelligent Transportation Systems. Sep. 2020. vol. 21, No. 9. pp. 3848-3858. (Year: 2020).*

(Continued)

*Primary Examiner* — Timothy A Brainard
(74) *Attorney, Agent, or Firm* — Seyfarth Shaw LLP/Qualcomm Incorporated

(57) ABSTRACT

A processor-implemented method for radar-based tracking of an object includes transmitting radio frequency (RF) signals. In response to the transmitted RF signals, one or more return RF signals are received. Features of the one or more return RF signals are extracted. A graph comprising multiple nodes is generated. Each node of the graph corresponds to the one or more return RF signals and indicates a potential target object detection. An existence of a plurality of edges is determined. Each edge connects a pair of nodes in the graph based on features of the return RF signals. The existence of each edge indicates that the pair of nodes connected correspond to a same target object.

22 Claims, 9 Drawing Sheets

(56) References Cited

OTHER PUBLICATIONS

Su, Ningyuan; Chen, Xiaolong; Guan, Jian; Huang, Yong. "Maritime Target Detection Based on Radar Graph Data and Graph Convolutional Network". IEEE Geoscience and Remote Sensing Letters. 2022. vol. 19. (Year: 2022).*
International Search Report and Written Opinion—PCT/US2023/021775—ISA/EPO—Nov. 21, 2023.
Partial International Search Report—PCT/US2023/021775—ISA/EPO—Aug. 21, 2023.
Su N., et al., "Maritime Target Detection Based on Radar Graph Data and Graph Convolutional Network", IEEE Geoscience and Remote Sensing Letters, IEEE, USA, vol. 19, Dec. 6, 2021, 3 Pages.

* cited by examiner

RADAR CLUSTERING USING MACHINE LEARNING

FIELD OF INVENTION

Aspects of the present disclosure generally relate to radar-based tracking of objects.

BACKGROUND

Artificial neural networks may comprise interconnected groups of artificial neurons (e.g., neuron models). The artificial neural network may be a computational device or may be represented as a method to be performed by a computational device.

Neural networks consist of operands that consume tensors and produce tensors. Neural networks can be used to solve complex problems, however, because the network size and the number of computations that may be performed to produce the solution may be voluminous, the time for the network to complete a task may be long. Furthermore, because these tasks may be performed on mobile devices, which may have limited computational power, the computational costs of deep neural networks may be problematic.

Convolutional neural networks are a type of feed-forward artificial neural network. Convolutional neural networks may include collections of neurons that each have a receptive field and that collectively tile an input space. Convolutional neural networks (CNNs), such as deep convolutional neural networks (DCNs), have numerous applications. In particular, these neural network architectures are used in various technologies, such as image recognition, pattern recognition, speech recognition, autonomous driving, and other classification tasks.

SUMMARY

The present disclosure is set forth in the independent claims, respectively. Some aspects of the disclosure are described in the dependent claims.

In one aspect of the present disclosure, a processor-implemented method includes transmitting radio frequency (RF) signals. The method further includes receiving, in response to the transmitted RF signals, one or more return RF signals. The method still further includes extracting features of the one or more return RF signals. The method also includes generating a graph comprising a number of nodes. Each node corresponds to the one or more return RF signals and indicating a potential target object detection. The method further includes determining an existence of a number of edges. Each edge connects a pair of nodes in the graph based on features of the return RF signals. The existence of each edge indicates that the pair of connected nodes correspond to a same target object.

In another aspect of the present disclosure, an apparatus is presented. The apparatus including means for transmitting radio frequency (RF) signals. The apparatus further includes means for receiving, in response to the transmitted RF signals, one or more return RF signals. The apparatus still further includes means for extracting features of the one or more return RF signals. The apparatus also includes means for generating a graph comprising a number of nodes. Each node corresponds to the one or more return RF signals and indicating a potential target object detection. The apparatus further includes means for determining an existence of a number of edges. Each edge connects a pair of nodes in the graph based on features of the return RF signals. The existence of each edge indicates that the pair of connected nodes correspond to a same target object.

In another aspect of the present disclosure, a non-transitory computer-readable medium with non-transitory program code recorded thereon is disclosed. The program code is executed by a processor and includes program code to transmit radio frequency (RF) signals. The program code further includes program code to receive, in response to the transmitted RF signals, one or more return RF signals. The program code still further includes program code to extract features of the one or more return RF signals. The program code also includes program code to generate a graph comprising a number of nodes. Each node corresponds to the one or more return RF signals and indicating a potential target object detection. The program code further includes program code to determine an existence of a number of edges. Each edge connects a pair of nodes in the graph based on features of the return RF signals. The existence of each edge indicates that the pair of connected nodes correspond to a same target object.

In another aspect of the present disclosure, an apparatus is presented. The apparatus has a memory and one or more processors coupled to the memory. The processor(s) is configured to transmit radio frequency (RF) signals. The processor(s) is further configured to receive, in response to the transmitted RF signals, one or more return RF signals. The processor(s) is still further configured to extract features of the one or more return RF signals. The processor(s) is also configured to generate a graph comprising a number of nodes. Each node corresponds to the one or more return RF signals and indicates a potential target object detection. The processor(s) is further configured to determine an existence of a number of edges, each edge connecting a pair of nodes in the graph based on features of the return RF signals. The existence of each edge indicates that the pair of connected nodes correspond to a same target object.

In one aspect of the present disclosure, a processor-implemented method includes receiving a dataset including one or more radar detections associated with an identification of a ground truth object that produced each of the one or more radar detections. The method further includes training a classifier to construct a graph with nodes connected by a number of edges, each node corresponding to a radar detection of the one or more radar detections and an edge connecting a pair of nodes based on the identification of the ground truth object.

Another aspect of the present disclosure is directed to an apparatus including means for receiving a dataset including one or more radar detections associated with an identification of a ground truth object that produced each of the one or more radar detections. The apparatus further includes means for training a classifier to construct a graph with nodes connected by a number of edges, each node corresponding to a radar detection of the one or more radar detections and an edge connecting a pair of nodes based on the identification of the ground truth object.

In another aspect of the present disclosure, a non-transitory computer-readable medium with non-transitory program code recorded thereon is disclosed. The program code is executed by a processor and includes program code to receive a dataset including one or more radar detections associated with an identification of a ground truth object that produced each of the one or more radar detections. The program code further includes program code to train a classifier to construct a graph with nodes connected by a number of edges, each node corresponding to a radar detection of the one or more radar detections and an edge connecting a pair of nodes based on the identification of the ground truth object.

Another aspect of the present disclosure is directed to an apparatus having a memory and one or more processors coupled to the memory. The processor(s) is configured to receive a dataset including one or more radar detections associated with an identification of a ground truth object that produced each of the one or more radar detections. The processor(s) is further configured to train a classifier to construct a graph with nodes connected by a number of edges, each node corresponding to a radar detection of the one or more radar detections and an edge connecting a pair of nodes based on the identification of the ground truth object.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
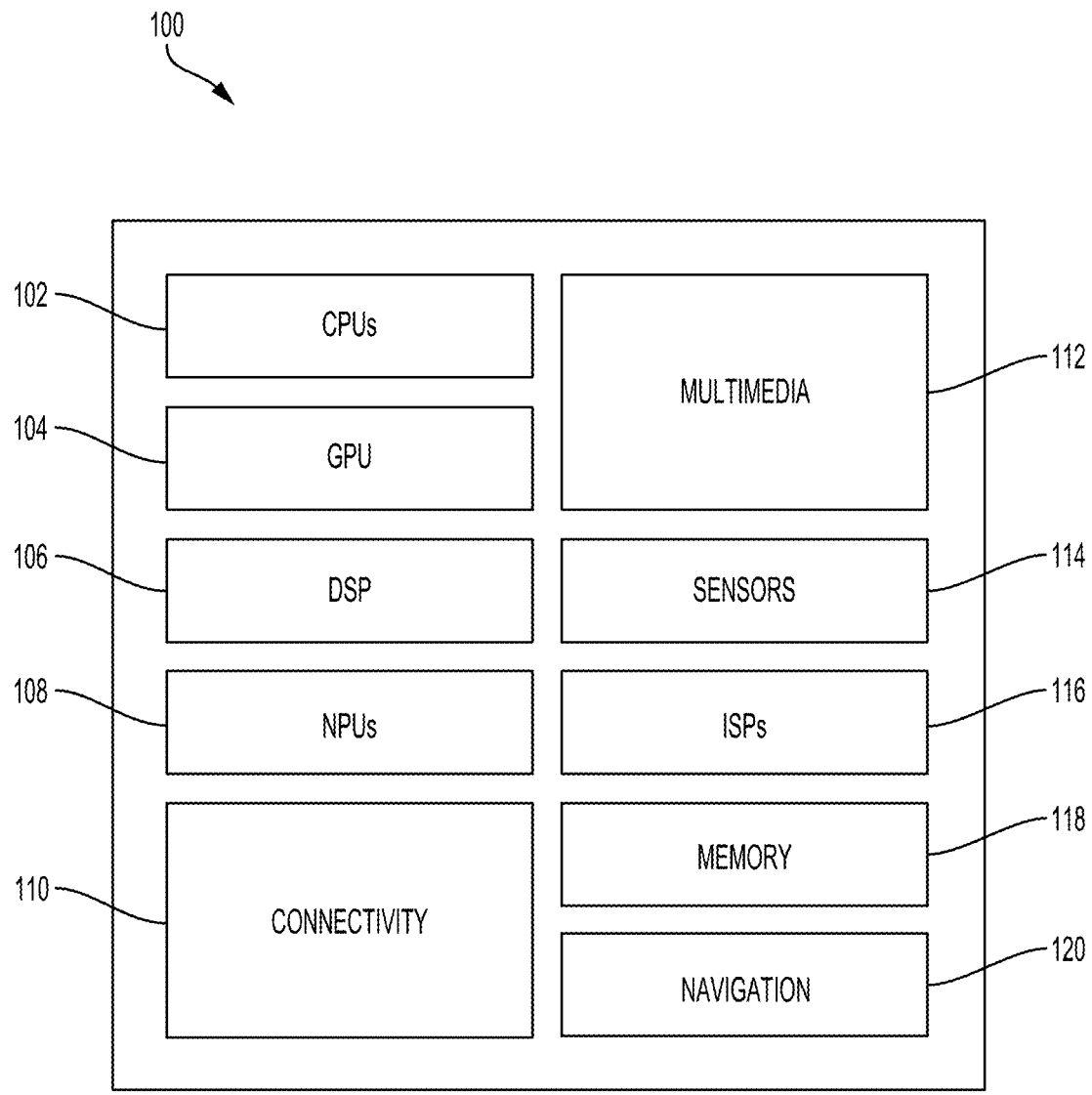
FIG. 1 illustrates an example implementation of a neural network using a system-on-a-chip (SoC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Radars are some of the most commonly used sensors in autonomous driving. The time of flight from reflections of transmitted radar pulses are used to determine the positions and relative velocities of objects around the radar.

Object tracking applications that use radar sensors associate the obtained radar returns with tracks of vehicles that have been detected and are being tracked by the system. A radar return, which may also be referred to as a radar echo or a radar ping, may be considered a signal indication of an object which has reflected energy transmitted by a primary radar signal. Performing correct association is important as cross-association can cause track divergence and eventual tracking failure. Naïvely associating radar returns to the tracked vehicles based on proximity and relative velocity alone often tends to be imperfect. This is particularly true when there is a high density of vehicles, which may result in reflections from multiple vehicles appearing close to each other, or individual rays undergoing multiple reflections from multiple surfaces. One improvement over this naïve technique is to first perform a pre-processing step on the radar pings (radar return) in each frame by performing a clustering operation to group pings that are likely to have come from the same vehicle. An association step may also be performed where clusters are associated to the tracked vehicles. Conventional clustering algorithms such as K-nearest neighbors, for example, utilize extensive fine-tuning in order to work. Additionally, in an attempt to prevent cross-associations, conventional clustering algorithms may be tuned to work in a highly under-clustered regime in which the clustering step is inconclusive on many pings, leaving the bulk of the work to the association step. This scenario is commonly faced when there are large vehicles, such as trucks, in a scene or environment in which the primary radar signal is transmitted. Radar returns from such vehicles may be separated by large distances due to the large size of the vehicle, making it a challenging task to cluster these returns together.

To address these and other challenges, aspects of the present disclosure are directed to a robust radar clustering process that learns to incorporate prior radar detections from the environment to improve, and in some aspects, significantly improve, clustering accuracy. The clustering process involves constructing a graph of N nodes with one node for each ping received in a radar frame (a frame refers to a collection of periodic segments of the radar signal wave), and an edge between every pair of pings that a trained classifier may determine to be coming from the same object. Once the graph is created, a process for determining connected components within the graph, such as a depth first search, for example, may determine the connected components of the graph. The process may generate as output clusters formed from the list of components.

FIG. 1 illustrates an example implementation of a system-on-a-chip (SoC) 100, which may include a central processing unit (CPU) 102 or a multi-core CPU configured for radar clustering to track objects using an artificial neural network. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SoC 100 may also include a sensor processor 114, image signal processors (ISPs) 116, and/or navigation module 120, which may include a global positioning system.

The SoC 100 may be based on an ARM instruction set. In an aspect of the present disclosure, the instructions loaded into the general-purpose processor 102 may include code to transmit radio frequency (RF) signals. The general-purpose processor 102 may also include code to receive, in response to the transmitted RF signals, one or more return RF signals.

The general-purpose processor 102 may further include code to extract features of the one or more return RF signals. The general-purpose processor 102 may also include code to generate a graph comprising multiple nodes. Each node corresponds to the one or more return RF signals and indicates a potential target object detection. The general-purpose processor 102 may include code to determine an existence of a multiple edges. Each edge connects a pair of nodes in the graph based on features of the return RF signals. The existence of each edge indicates that the pair of nodes connected correspond to a same target object.

In another aspect of the present disclosure, the instructions loaded into the general-purpose processor 102 may include code to receive a dataset including one or more radar detections associated with an identification of a ground truth object that produced each of the one or more radar detections. The general-purpose processor 102 may also include code to train a classifier to construct a graph with nodes connected by a plurality of edges. Each node corresponds to a radar detection of the one or more radar detections and an edge connects a pair of nodes based on the identification of the ground truth object.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
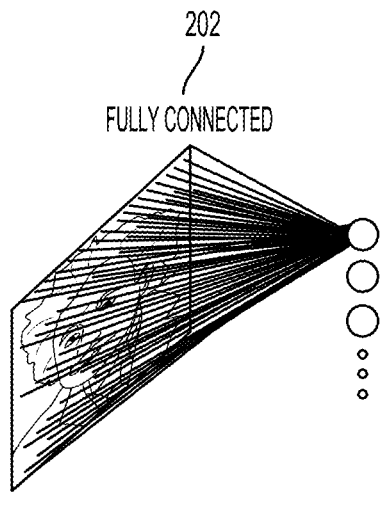
FIGS. 2A, 2B, and 2C are diagrams illustrating a neural network, in accordance with aspects of the present disclosure.
Figure 2B:
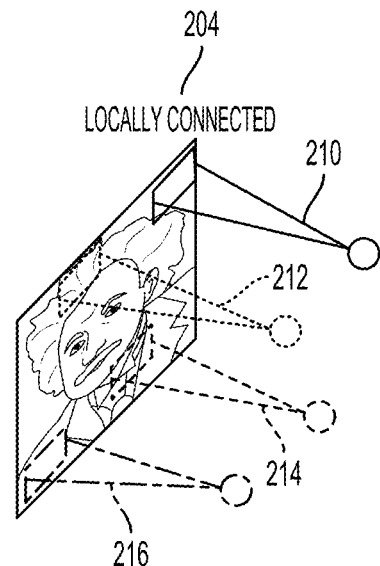

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
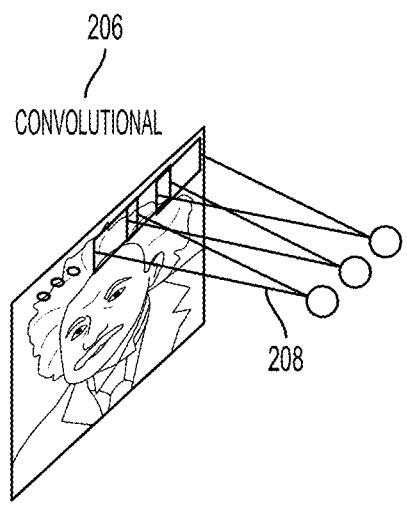

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
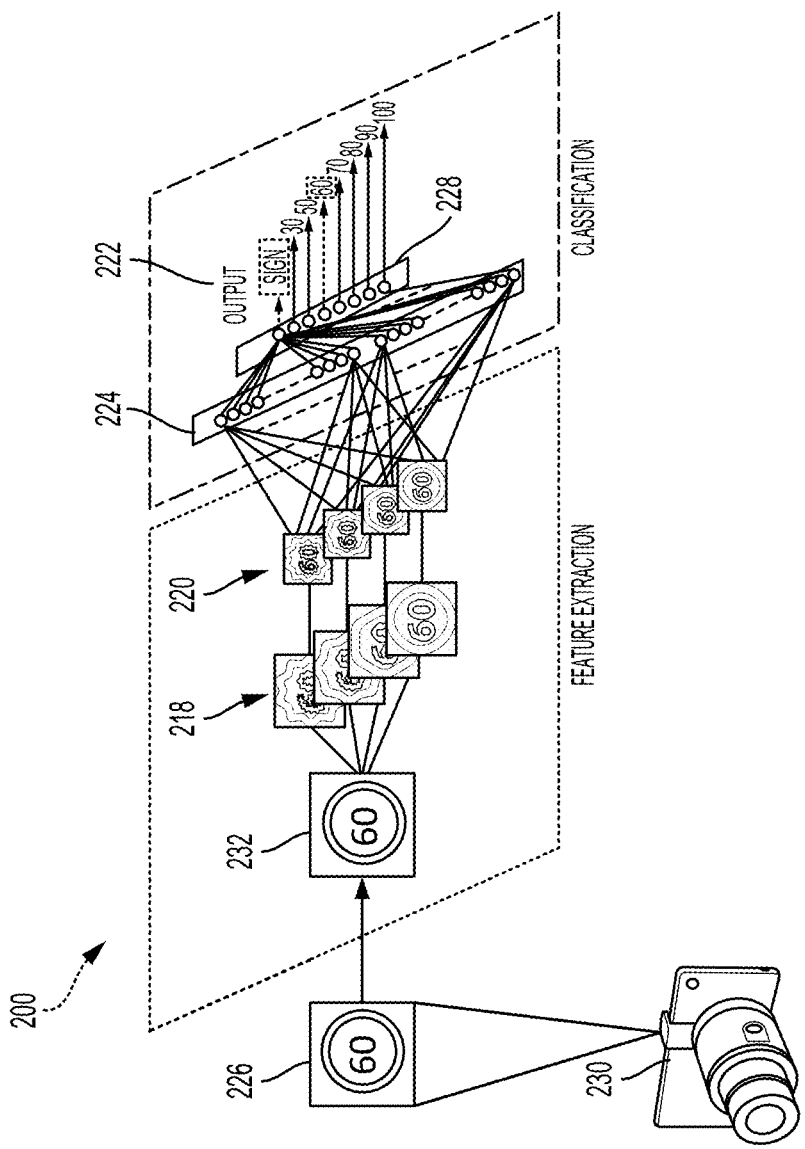
FIG. 2D is a diagram illustrating an exemplary deep convolutional network (DCN), in accordance with aspects of the present disclosure.

One type of convolutional neural network is a deep convolutional neural network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axis of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
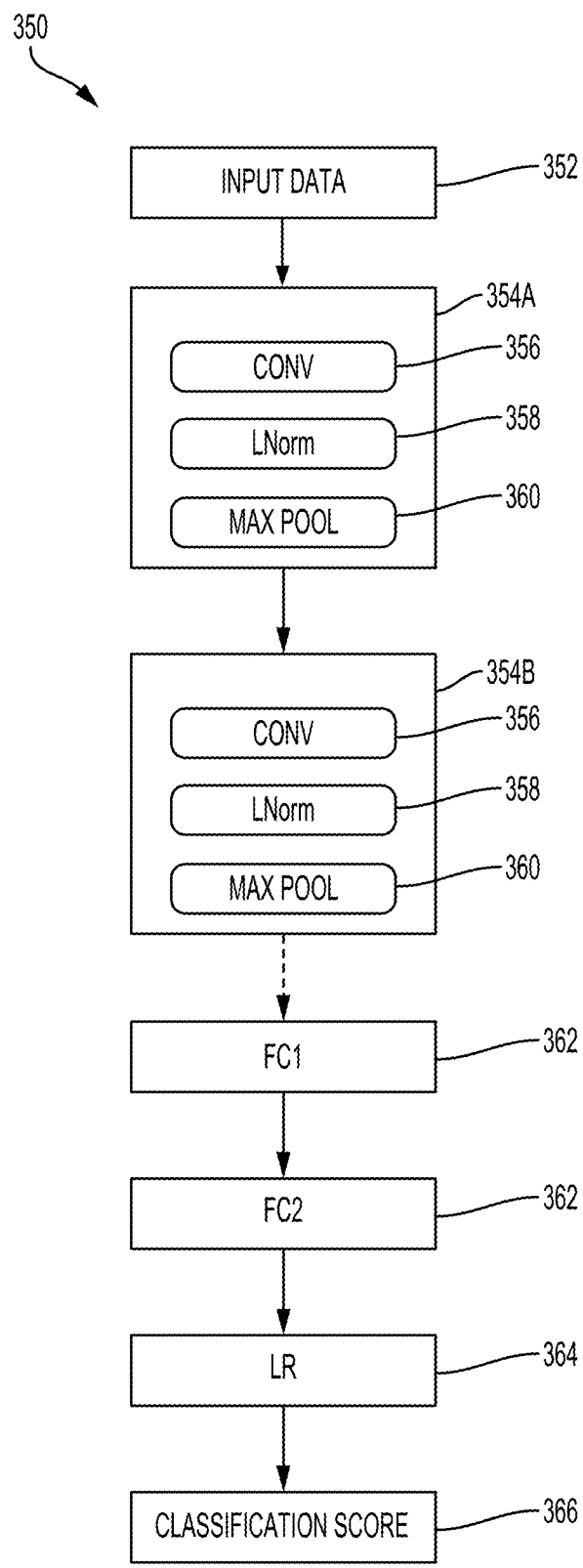
FIG. 3 is a block diagram illustrating an exemplary deep convolutional network (DCN), in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SoC 100 to achieve high performance and low power consumption. In alternative embodiments, the parallel filter banks may be loaded on the DSP 106 or an ISP 116 of an SoC 100. In addition, the deep convolutional network 350 may access other processing blocks that may be present on the SoC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
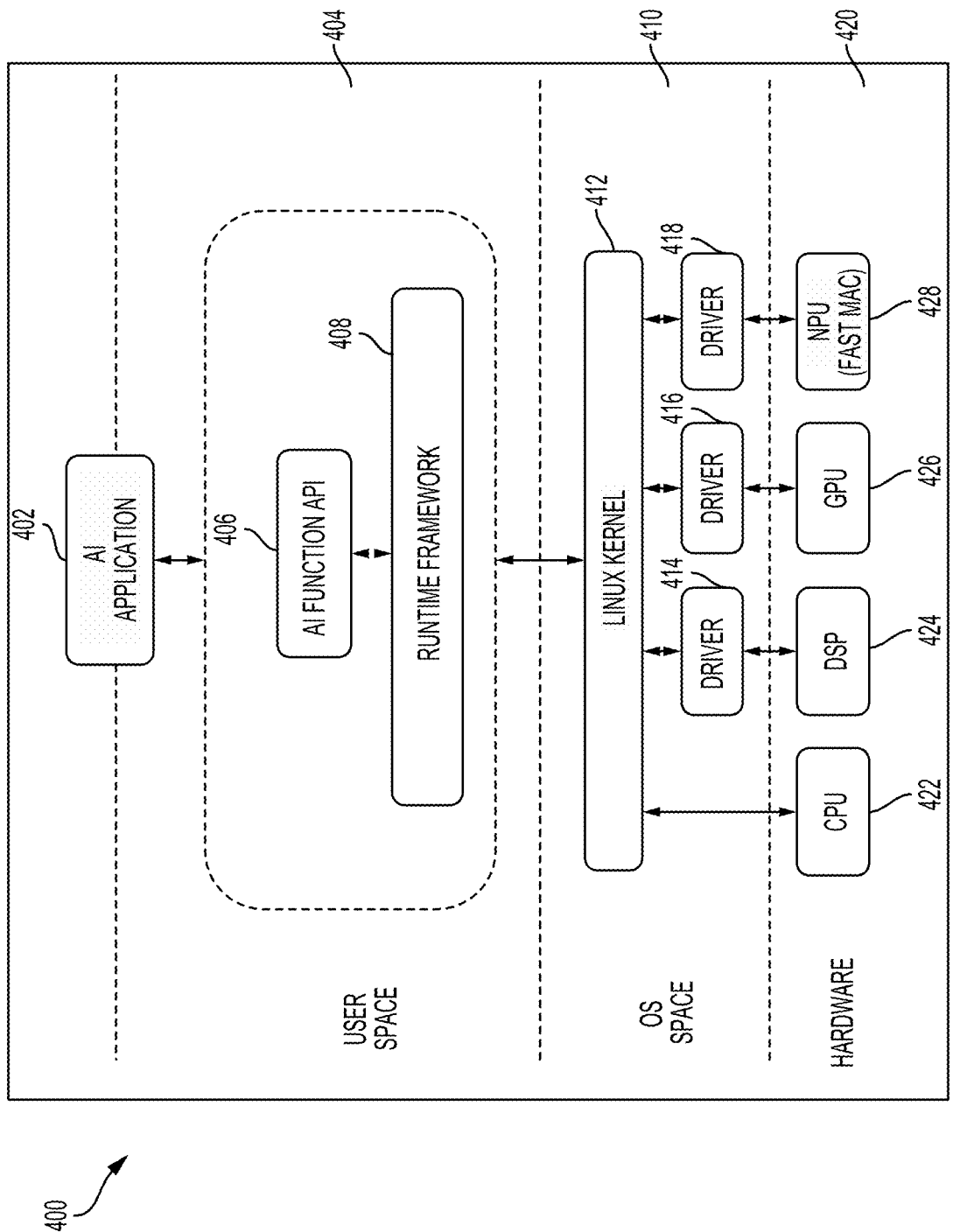
FIG. 4 is a block diagram illustrating an exemplary software architecture that may modularize artificial intelligence (AI) functions.

FIG. 4 is a block diagram illustrating an exemplary software architecture 400 that may modularize artificial intelligence (AI) functions. Using the architecture, applications may be designed that may cause various processing blocks of a system-on-a-chip (SoC) 420 (for example a CPU 422, a DSP 424, a GPU 426 and/or an NPU 428) to support adaptive rounding as disclosed for post-training quantization for an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space, such as a Linux Kernel 412, running on the SoC 420.

The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

The application 402 (e.g., an AI application) may be configured to call functions defined in a user space 404 that may, for example, provide for the detection and recognition of a scene indicative of the location in which the device currently operates. The application 402 may, for example, configure a microphone and a camera differently depending on whether the recognized scene is an office, a lecture hall, a restaurant, or an outdoor setting such as a lake. The application 402 may make a request to compiled program code associated with a library defined in a SceneDetect application programming interface (API) 406 to provide an estimate of the current scene. This request may ultimately rely on the output of a differential neural network configured to provide scene estimates based on video and positioning data, for example.

A run-time engine 408, which may be compiled code of a Runtime Framework, may be further accessible to the application 402. The application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SoC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the differential neural network may be configured to run on a combination of processing blocks, such as a CPU 422 and a GPU 426, or may be run on an NPU 428.

As described, aspects of the present disclosure are directed to a radar clustering process that learns to incorporate priors from the environment to improve, and in some aspects, significantly improve, clustering accuracy. The radar clustering process involves constructing a graph of N nodes corresponding to each radar ping or return signal (which may be referred to as a detection) received in a radar frame. The graph also includes an edge between every pair of pings or detections that a trained classifier determines to be reflected from the same object. In some aspects, the classifier may, for example be a multilayer perceptron (MLP).

A set of features of the radar ping or return signal may be extracted. For instance, the features may be extracted by subjecting the input to one or more convolutional layers (e.g., element 356 shown in FIG. 3). The input features may, for example, include coordinates (e.g., polar coordinates or Cartesian coordinates) of the ping or detection resolved along the radar's axis, a longitudinal component of relative velocity estimated from Doppler measurement as Doppler/cosine (azimuth angle measured with respect to the forward direction), a radar cross-section (RCS) of the ping or detection or sine of the azimuth angle of the ping or detection. Additionally, in some aspects, global frame level features, such as the density of points near a ping or detection may be used to determine whether an edge exists between two nodes, thus indicating that the corresponding pings are from the same object.

The input features may be supplied to the trained classifier, which may generate a prediction of the existence of an edge. As such, the prediction may provide an indication of whether the return signals connected by the edge are the same object.

Once the graph is created, a process for determining connected components within the graph, such as a depth first search, for example, may determine the connected components of the graph. The process may generate as output clusters formed from the list of components.

In some aspects, the network may be trained using annotated data (e.g., data collected on highways). The data may be annotated such that all pings or detections are associated with an identification (ID) of a ground truth object, which produced the ping. The data from each radar frame may then construct a graph with vertices or nodes that represent the pings and edges such that there may be one edge between each pair of nodes that are included as positive samples in training the classifier. The graph construction and the subsequent choice of samples for training may be performed to improve, and in some aspects optimize, the ease of learning to determine the existence of an edge.

In accordance with aspects of the present disclosure, an edge may be added between nodes corresponding to a pair of pings from the same object (e.g., vehicle) based on a proximity threshold. For instance, an edge may be added if the proximity between the radar pings are within a proximity threshold (e.g., two meters). Then, the nodes corresponding to pings from each object may form multiple connected components. Further edges may be progressively added between pings from the same object but different connected components, until the remaining nodes from the object are connected. In some aspects, only the shortest edges between components are considered. Each of the pairs of nodes, which are connected by an edge in the resulting graph, are considered as positive samples for training the classifier. In addition, to promote invariance of the learned classifier (e.g., MLP) to the ordering of input pings, for every pair of pings used as a sample in training, the corresponding swapped pair with the ordering of pings flipped may also be included as a positive training sample.

On the other hand, each ping from a different object that is closest to a target object may serve as a negative training example. In this way, the hardest negative examples (most likely to cause a misdetection) may be included in the training set.

Figure 5A:
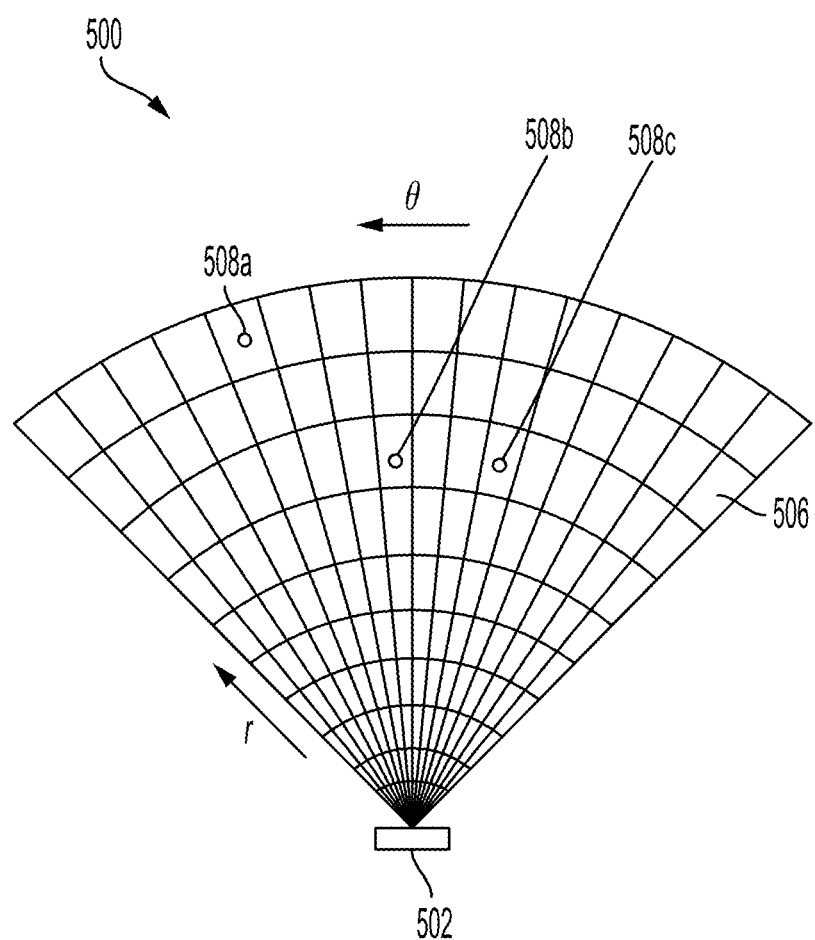
FIG. 5A is a diagram illustrating an example polar grid, in accordance with aspects of the present disclosure.

FIG. 5A is a diagram illustrating an example polar grid 500 in accordance with aspects of the present disclosure. A transmitter (e.g., an array of transmit antennas) of a radar 502 may transmit pulses of electromagnetic radio frequency (RF) waves. The transmitted RF waves may be reflected from one or more objects encountered in the transmission path. The object may, for example, be a vehicle, a person, a building structure, or other object. A portion of the electromagnetic RF waves that are reflected from the objects may be returned to a receiver (e.g., an array of receive antennas) of the radar 502.

In an aspect, the radar 502 may be an imaging radar that uses beamforming to scan horizontally and vertically. Beamforming is a technique used to aim the effective direction of a radar beam by changing the delay between different transmitting antennas so that the signals add constructively in a specified direction. As such, the radar 502 may scan horizontally and vertically across the sensing area by using a transmitter that includes an array of electronically steered antennas (not shown). The radar 502 may be positioned at a fixed location or may be mobile (e.g., coupled to a vehicle).

The returned responses (radar returns or pings) measured by the radar 502 may be characterized as the polar grid 500 having observation cells 506. Each cell 506 represents the measured returned response value at a specific range (r) and angle/azimuth (θ). Each cell 506 is alternately referred to as a range-angle bin. Features 508a-c (e.g., a returned response) may be extracted from the cells 506 to determine whether the feature 508a-c are an indication of an object. Each feature (e.g., 508a-c) within a respective cell 506 may be identified as having parameters such as range, Doppler measurement, azimuth, and elevation. As an example, a feature 508 within a cell 506 may be the signal-to-noise ratio (SNR) computed by a constant false alarm rate (CFAR) algorithm. However, it should be understood that other methods may be used to target and identify features 508 within a cell 506.

As described, a graph may be constructed in which each ping or returned response in a radar frame (e.g., each feature 508a-c) may be represented as a node. The features 508 may be input to the neural network to determine whether an edge connection between each pair of nodes exists based on the features 508.

Figure 5B:
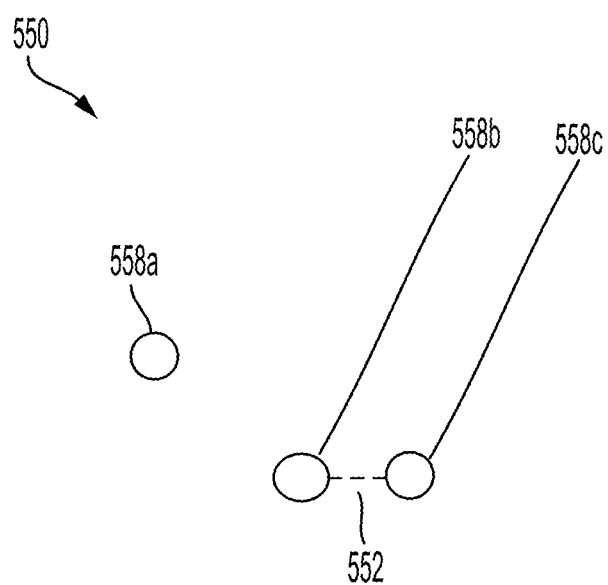
FIG. 5B is a diagram illustrating an example graph 550 of radar clustering using an artificial neural network in accordance with aspects of the present disclosure.

FIG. 5B is a diagram illustrating an example graph 550 of radar clustering using an artificial neural network in accordance with aspects of the present disclosure. Referring to FIG. 5B, the features 508a-c are represented in the graph 550 as corresponding nodes 558a-c, respectively. Radar data for each of the nodes 558a-c may be analyzed, for example using a depth first search to determine whether the nodes (e.g., 558a-c) correspond to a same object. For instance, as shown in FIG. 5B, considering the radar data (e.g., Doppler measurements) corresponding to node 558b and node 558c, nodes 558b and 558c may be determined to be from a same object. Thus, an edge 552 is included in the graph 550 connecting node 558b and 558c. Conversely, considering the radar data (e.g., Doppler measurements) corresponding to node 558a and node 558b, nodes 558a and 558b may be determined to be from different objects.

Figure 6:
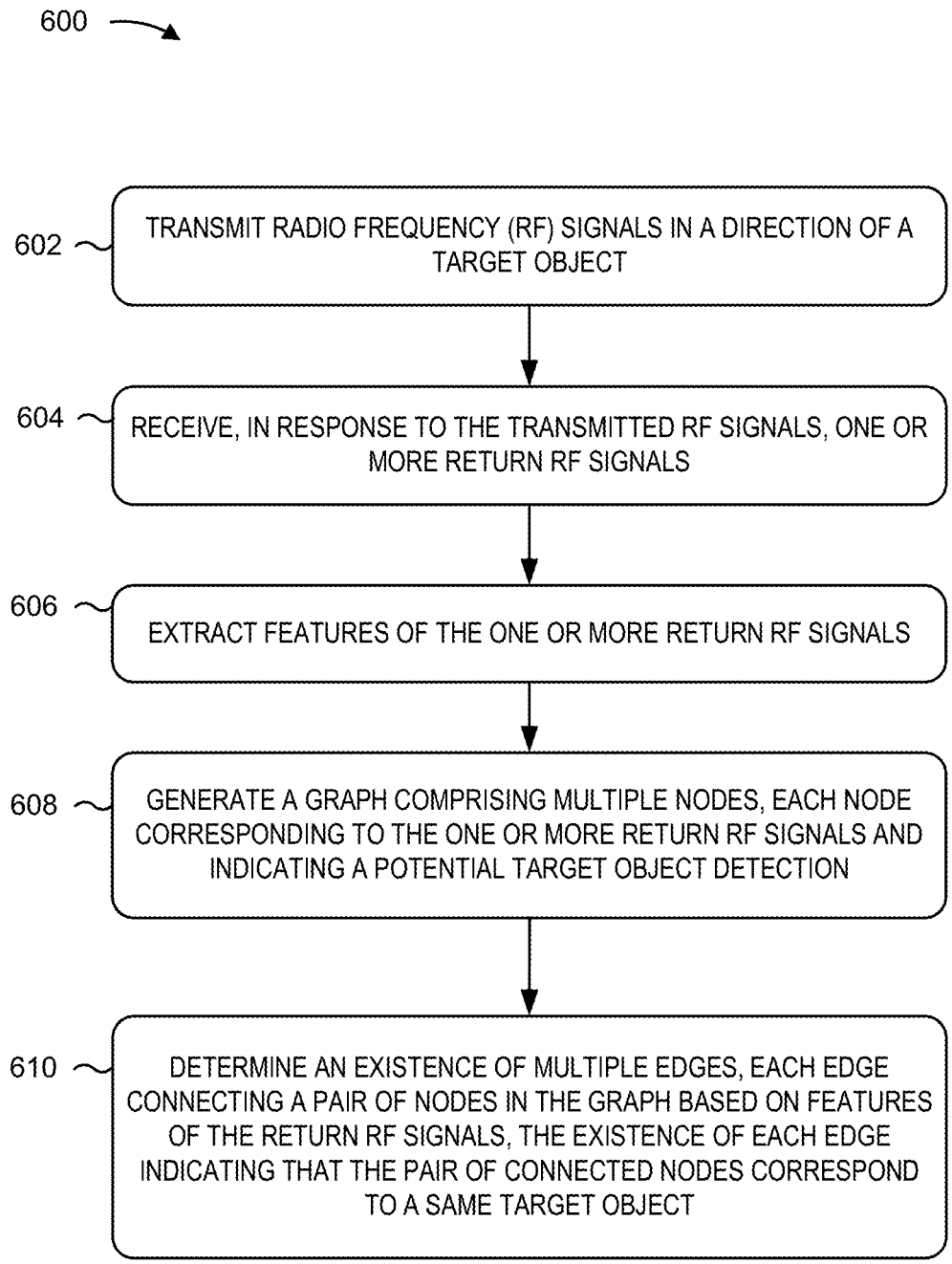
FIG. 6 is a flow diagram illustrating a method for radar-based tracking of an object, in accordance with aspects of the present disclosure.

FIG. 6 is a flow diagram illustrating a method 600 for radar-based tracking of an object using radar clustering via an artificial neural network, in accordance with aspects of the present disclosure. The method may be implemented by a processor, for example. As shown in FIG. 6, at block 602, the method 600 transmits radio frequency (RF) signals. For instance, as described with reference to FIG. 5, a transmitter (e.g., an array of transmit antennas) of the radar 502 may transmit pulses of electromagnetic radio frequency (RF) waves.

At block 604, the method 600 receives, in response to the transmitted RF signals, one or more return RF signals. As described with reference to FIG. 5, the transmitted RF waves may be reflected from one or more objects encountered in the transmission path. A portion of the electromagnetic RF waves that are reflected from the objects may be returned to a receiver (e.g., an array of receive antennas) of the radar 502.

At block 606, the method 600 extracts features of the one or more return RF signals. As described, a set of features of the radar ping or return signal may be extracted. For instance, the features may be extracted by subjecting the input to one or more convolutional layers (e.g., element 356 shown in FIG. 3). The input features may, for example, include x and y coordinates of the ping or detection resolved along the radar's axis, a longitudinal component of relative velocity estimated from Doppler measurement as Doppler/cosine (azimuth angle measured with respect to the forward direction), a radar cross-section (RCS) of the ping or detection, or sine of the azimuth angle of the ping or detection.

At block 608, the method 600 generates a graph comprising multiple nodes. Each node corresponds to the one or more return RF signals and indicates a potential target object detection. As described, the radar clustering process involves constructing a graph of N nodes corresponding to each radar ping or return signal (which may be referred to as a detection) received in a radar frame.

At block 610, the method 600 determines an existence of multiple edges. Each edge connects a pair of nodes in the graph based on features of the return RF signals. The existence of each edge indicates that the pair of connected nodes correspond to a same target object. As described, an edge may be added between every pair of pings from the same vehicle based on a proximity threshold. For instance, an edge may be added if the proximity between the radar pings are within a proximity threshold (e.g., two meters). Then, the nodes corresponding to pings from each object may form multiple connected components. Further edges may be progressively added between pings from the same object but with different connected components, until the remaining nodes from the object are connected.

Figure 7:
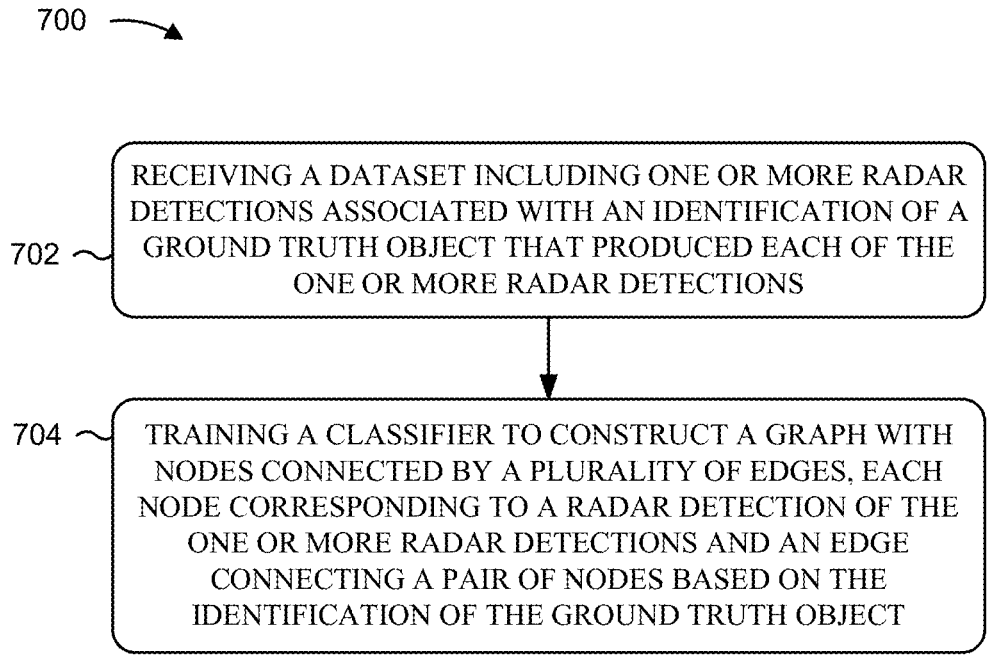
FIG. 7 is a flow diagram illustrating a method for training a classifier for radar clustering via an artificial neural network, in accordance with aspects of the present disclosure.

FIG. 7 is a flow diagram illustrating a method 700 for training a classifier for radar clustering via an artificial neural network, in accordance with aspects of the present disclosure. The method may be implemented by a processor, for example. As shown in FIG. 7, at block 702, the method 700 receives a dataset including one or more radar detections associated with an identification of a ground truth object that produced each of the one or more radar detections.

At block 704, the method 700 training a classifier to construct a graph with nodes connected by a plurality of edges, each node corresponding to a radar detection of the one or more radar detections and an edge connecting a pair of nodes based on the identification of the ground truth object. In some aspects, the classifier is trained to determine an edge connecting a pair of nodes if the nodes correspond to the same identification of the ground truth object. Furthermore, in some aspects, an edge may be added between nodes corresponding to a pair of pings from the same object (e.g., vehicle) based on a proximity threshold. For instance, an edge may be added if the proximity between the radar pings are within a proximity threshold (e.g., two meters). Then, the nodes corresponding to pings from each object may form multiple connected components. Further edges may be progressively added between pings from the same object but different connected components, until the remaining nodes from the object are connected. In some aspects, only the shortest edges between components are considered. Each of the pairs of nodes, which are connected by an edge in the resulting graph, are considered as positive samples for training the classifier. In addition, to promote invariance of the learned classifier (e.g., MLP) to the ordering of input pings, for every pair of pings used as a sample in training, the corresponding swapped pair with the ordering of pings flipped may also be included as a positive training sample.

Implementation examples are provided in the following numbered clauses:

1. A processor-implemented method, comprising:
   transmitting radio frequency (RF) signals;

receiving, in response to the transmitted RF signals, one or more return RF signals;

extracting features of the one or more return RF signals;

generating a graph comprising a plurality of nodes, each node corresponding to the one or more return RF signals and indicating a potential target object detection; and determining an existence of a plurality of edges, each edge connecting a pair of nodes in the graph based on features of the return RF signals, the existence of each edge indicating that the pair of connected nodes correspond to a same target object.

2. The processor-implemented method of clause 1, further comprising tracking the target object based on the determined existence of each edge.

3. The processor-implemented method of clause 1 or 2, further comprising:

determining coordinates of each node along a radar axis;

computing a distance between nodes based on the coordinates; and comparing the distance to a proximity threshold.

4. The processor-implemented method of any of clauses 1-3, in which an identification of a target object is predicted based on one the features of the one or more return RF signals.

5. The processor-implemented method of any of clauses 1-4, in which the determining is invariant to an order in which the return RF signals are received.

6. The processor-implemented method of any of clauses 1-5, in which the RF signals comprise radar signals.

7. The processor-implemented method of any of clauses 1-6, in which the RF signals are transmitted in the direction of a target object comprising a vehicle or a pedestrian.

8. An apparatus comprising:

a memory; and at least one processor coupled to the memory, the at least one processor configured:

to transmit radio frequency (RF) signals;

to receive, in response to the transmitted RF signals, one or more return RF signals;

to extract features of the one or more return RF signals;

to generate a graph comprising a plurality of nodes, each node corresponding to the one or more return RF signals and indicating a potential target object detection; and to determine an existence of a plurality of edges, each edge connecting a pair of nodes in the graph based on the features of the return RF signals, the existence of each edge indicating that the pair of connected nodes correspond to a same target object.

9. The apparatus of clause 8, in which the at least one processor is further configured to track a target object based on the determined existence of each edge.

10. The apparatus of clause 8 or 9, in which the at least one processor is further configured:

to determine coordinates of each node along a radar axis;

to compute a distance between nodes based on the coordinates; and to compare the distance to a proximity threshold.

11. The apparatus of any of clauses 8-10, in which the at least one processor is further configured to predict an identification of the target object based on one the features of the one or more return RF signals.

12. The apparatus of any of clauses 8-11, in which the at least one processor is further configured to determine the existence of the plurality of edges in a manner that is invariant to an order in which the return RF signals are received.

13. The apparatus of any of clauses 8-12, in which the RF signals comprise radar signals.

14. The apparatus of any of clauses 8-13, in which the RF signals are transmitted in the direction of a target object comprising a vehicle or a pedestrian.

15. A processor-implemented method, comprising:

receiving a dataset including one or more radar detections associated with an identification of a ground truth object that produced each of the one or more radar detections; and training a classifier to construct a graph with nodes connected by a plurality of edges, each node corresponding to a radar detection of the one or more radar detections and an edge connecting a pair of nodes based on the identification of the ground truth object.

16. The processor-implemented method of clause 15, in which the classifier is further trained to determine the edge connecting a pair of radar detections corresponding to nodes based on proximity threshold.

17. The processor-implemented method of clause 15 or 16, in which the classifier is further trained to progressively add additional edges between radar detections from the same object but different connected components.

18. The processor-implemented method of any of clauses 15-17, in which the classifier is further trained to progressively add only a shortest edge of the additional edges between radar detections from the same object but different connected components.

19. The processor-implemented method of any of clauses 15-18, in which each pair of connected nodes is a positive training sample in a first set of positive training samples.

20. The processor-implemented method of any of clauses 15-19, further comprising training the classifier with negative training examples, each negative training example comprising a second radar detection corresponding to a different object that is nearest to a target object.

21. An apparatus comprising:

a memory; and at least one processor coupled to the memory, the at least one processor configured:

to receive a dataset including one or more radar detections associated with an identification of a ground truth object that produced each of the one or more radar detections; and to train a classifier to construct a graph with nodes connected by a plurality of edges, each node corresponding to a radar detection of the one or more radar detections and an edge connecting a pair of nodes based on the identification of the ground truth object.

22. The apparatus of clause 21, in which the at least one processor is further configured to train the classifier to determine the edge connecting a pair of radar detections corresponding to nodes based on proximity threshold.

23. The apparatus of clause 21 or 22, in which the at least one processor is further configured to train the classifier to progressively add additional edges between radar detections from the same object but different connected components.

24. The apparatus of any of clauses 21-23, in which the at least one processor is further configured to train the classifier to progressively add only a shortest edge of the additional edges between radar detections from the same object but different connected components.

25. The apparatus of clauses 21-24, in which each pair of connected nodes is a positive training sample in a first set of positive training samples.

26. The apparatus of clauses 21-25, in which the at least one processor is further configured to train the classifier with negative training examples, each negative training example comprising a second radar detection corresponding to a different object that is nearest to a target object.

In one aspect, the transmitting means, the receiving means, the extracting means, the generating means, the determining means, the predicting means, the means for receiving a dataset, and/or the training means may be the CPU 102, program memory associated with the CPU 102, the dedicated memory block 118, fully connected layers 362, and/or the NPU 428, configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method performed by one or more processors, the processor-implemented method comprising:
    transmitting radio frequency (RF) signals to track a target object;
    receiving, in response to the transmitted RF signals, one or more return RF signals;
    extracting features of the one or more return RF signals;
    generating a graph comprising a plurality of nodes, each node corresponding to an RF return signal of the one or more return RF signals and indicating a potential target object detection; and
    determining, by a classifier, an existence of an edge between a pair of nodes of the plurality of nodes based on the features of corresponding return RF signals of the one or more return RF signals and a density of points in an area near each node of the plurality of nodes, the existence of the edge indicating that the pair of nodes connected by the edge correspond to a same target object, and the classifier being trained based on a set of prior examples including at least a negative example comprising a prior RF return signal from a different object than the target object that is closest in proximity to the target object.

2. The processor-implemented method of claim 1, further comprising tracking the target object based on the determined existence of the edge.

3. The processor-implemented method of claim 1, further comprising:
determining coordinates of each node along a radar axis;
computing a distance between nodes based on the coordinates; and
comparing the distance to a proximity threshold.

4. The processor-implemented method of claim 1, in which an identification of the target object is predicted based on one of the features of the one or more return RF signals.

5. The processor-implemented method of claim 1, in which the determining is invariant to an order in which the return RF signals are received.

6. The processor-implemented method of claim 1, in which the RF signals comprise radar signals.

7. The processor-implemented method of claim 1, in which the RF signals are transmitted in the direction of the target object comprising a vehicle or a pedestrian.

8. An apparatus comprising:
at least one memory; and
at least one processor coupled to the at least one memory, the at least one processor configured to:
transmit radio frequency (RF) signals to track a target object;
receive, in response to the transmitted RF signals, one or more return RF signals;
extract features of the one or more return RF signals;
generate a graph comprising a plurality of nodes, each node corresponding to an RF return signal of the one or more return RF signals and indicating a potential target object detection; and
determine, by a classifier, an existence of an edge between a pair of nodes of the plurality of nodes based on the features of corresponding return RF signals of the one or more return RF signals and a density of points in an area near each node of the plurality of nodes, the existence of the edge indicating that the pair of nodes connected by the edge correspond to a same target object, and the classifier being trained based on a set of prior examples including at least a negative example comprising a prior RF return signal from a different object than the target object that is closest in proximity to the target object.

9. The apparatus of claim 8, in which the at least one processor is further configured to track the target object based on the determined existence of the edge.

10. The apparatus of claim 8, in which the at least one processor is further configured to:
determine coordinates of each node along a radar axis;
compute a distance between nodes based on the coordinates; and
compare the distance to a proximity threshold.

11. The apparatus of claim 8, in which the at least one processor is further configured to predict an identification of the target object based on one of the features of the one or more return RF signals.

12. The apparatus of claim 8, in which the at least one processor is further configured to determine the existence of the plurality of edges in a manner that is invariant to an order in which the return RF signals are received.

13. The apparatus of claim 8, in which the RF signals comprise radar signals.

14. The apparatus of claim 8, in which the RF signals are transmitted in the direction of the target object comprising a vehicle or a pedestrian.

15. A processor-implemented method performed by one or more processors, the processor-implemented method comprising:
receiving a dataset including one or more radar detections associated with an identification of a ground truth object that produced each of the one or more radar detections; and
training a classifier to construct a graph with nodes connected by a plurality of edges, each node corresponding to a radar detection of the one or more radar detections and an edge connecting a pair of nodes indicating that the radar detection for each of the pair of nodes correspond to a target object based on the identification of the ground truth object and a density of one or more radar detections in an area near each node, wherein the classifier is trained based on a set of examples that includes at least one negative training example comprising a prior radar detection corresponding to a different object that is nearest in proximity to the target object.

16. The processor-implemented method of claim 15, in which the classifier is further trained to determine the edge connecting a pair of radar detections corresponding to nodes based on proximity threshold.

17. The processor-implemented method of claim 15, in which the classifier is further trained to progressively add additional edges between radar detections from the same object but different connected components.

18. The processor-implemented method of claim 15, in which each pair of connected nodes is a positive training sample in a first set of positive training samples.

19. An apparatus comprising:
at least one memory; and
at least one processor coupled to the at least one memory, the at least one processor configured to:
receive a dataset including one or more radar detections associated with an identification of a ground truth object that produced each of the one or more radar detections; and
train a classifier to construct a graph with nodes connected by a plurality of edges, each node corresponding to a radar detection of the one or more radar detections and an edge connecting a pair of nodes indicating that the radar detection for each of the pair of nodes correspond to a target object based on the identification of the ground truth object and a density of one or more radar detections in an area near each node, wherein the classifier is trained based on a set of examples that includes at least one negative training example comprising a prior radar detection corresponding to a different object that is nearest in proximity to the target object.

20. The apparatus of claim 19, in which the at least one processor is further configured to train the classifier to determine the edge connecting a pair of radar detections corresponding to nodes based on proximity threshold.

21. The apparatus of claim 19, in which the at least one processor is further configured to train the classifier to progressively add additional edges between radar detections from the same object but different connected components.

22. The apparatus of claim 19, in which each pair of connected nodes is a positive training sample in a first set of positive training samples.

* * * * *